(12) United States Patent
Roberts et al.

(10) Patent No.: US 8,547,524 B2
(45) Date of Patent: Oct. 1, 2013

(54) ACTIVE MASK VARIABLE DATA INTEGRAL IMAGING SYSTEM AND METHOD

(75) Inventors: David E. Roberts, Hillsboro, WI (US); Trebor R. Smith, Painter, VA (US); Joseph W. Wyse, Lexington, KY (US)

(73) Assignee: Lau Consulting, Inc., Lexington, KY (US)

( * ) Notice: Subject to any disclaimer, the term of this patent is extended or adjusted under 35 U.S.C. 154(b) by 966 days.

(21) Appl. No.: 12/293,387

(22) PCT Filed: Mar. 21, 2007

(86) PCT No.: PCT/US2007/064521
§ 371 (c)(1),
(2), (4) Date: Sep. 17, 2008

(87) PCT Pub. No.: WO2007/109725
PCT Pub. Date: Sep. 27, 2007

(65) Prior Publication Data
US 2009/0207389 A1   Aug. 20, 2009

Related U.S. Application Data

(60) Provisional application No. 60/784,203, filed on Mar. 21, 2006, provisional application No. 60/784,202, filed on Mar. 21, 2006.

(51) Int. Cl.
*G03B 17/54* (2006.01)
(52) U.S. Cl.
USPC .......................................................... 355/67
(58) Field of Classification Search
USPC .......................................................... 355/67
See application file for complete search history.

(56) References Cited

U.S. PATENT DOCUMENTS

| 992,151 A | 5/1911 | Berthon |
| 1,905,716 A | 4/1933 | Ives |

(Continued)

FOREIGN PATENT DOCUMENTS

| DE | 198 04 997 | 2/1999 |
| EP | 0 583 766 | 2/1994 |

(Continued)

OTHER PUBLICATIONS

Yu. A. Dudnikov, E. N. Antipova, B.K. Rozhkov, and N.P. Samusenko; "Determination of the Resolution in Cross Sections of a Three-Dimensional Integral Image, Produced by a Lens-Array Photographic System;" Sov. J. Opt. Technol. 49(6), Jun. 1982.

(Continued)

*Primary Examiner* — Rodney Fuller
(74) *Attorney, Agent, or Firm* — Fitch, Even, Tabin & Flannery LLP

(57) ABSTRACT

A system for forming an integral image includes an optics system spaced between an active digital mask and the first side of an integral lens array, where the integral lens array has a light sensitive material layer spaced relative to the second side of the integral lens array. The active digital mask may provide the image directly to the integral lens array, or the image may be focused on a projection screen placed relative to the integral lens array. The active digital mask can vary the provided image to create a three dimensional image and to account for distortions caused by the optics system or curvature in the integral lens array and/or the light sensitive material. Edible materials may be used for the integral lens array and light sensitive material.

47 Claims, 3 Drawing Sheets

(56) References Cited

U.S. PATENT DOCUMENTS

| | | |
|---|---|---|
| 1,918,705 A | 7/1933 | Ives |
| 1,935,471 A | 11/1933 | Kanolt |
| 1,984,471 A | 12/1934 | Fischer |
| 2,039,648 A | 5/1936 | Ives |
| 2,063,985 A | 12/1936 | Coffey |
| 2,622,472 A | 12/1952 | Bonnet |
| 2,724,312 A | 11/1955 | Gruetzner |
| 2,833,176 A | 5/1958 | Ossoinak |
| 3,154,415 A | 10/1964 | Kaulen |
| 3,241,429 A | 3/1966 | Rice et al. |
| 3,357,770 A | 12/1967 | Clay |
| 3,459,111 A | 8/1969 | Cooper, Jr. |
| 3,503,315 A | 3/1970 | de Montebello |
| 3,565,733 A | 2/1971 | Leach |
| 3,584,369 A | 6/1971 | de Montebello |
| 3,613,539 A | 10/1971 | Dudley |
| 3,676,130 A | 7/1972 | Burckhardt et al. |
| 3,683,773 A | 8/1972 | Dudley |
| 3,751,258 A | 8/1973 | Howe et al. |
| 4,552,442 A | 11/1985 | Street |
| 4,557,590 A | 12/1985 | Winnek |
| 4,668,063 A | 5/1987 | Street |
| 4,668,523 A | 5/1987 | Beglieter |
| 4,708,920 A | 11/1987 | Orensteen et al. |
| 4,714,656 A | 12/1987 | Bradshaw et al. |
| 4,732,453 A | 3/1988 | de Montebello et al. |
| 4,757,350 A | 7/1988 | Street |
| 4,878,735 A | 11/1989 | Vilums |
| 4,935,335 A | 6/1990 | Fotland |
| 5,279,912 A | 1/1994 | Telfer et al. |
| 5,359,454 A | 10/1994 | Steenblik et al. |
| 5,455,689 A | 10/1995 | Taylor et al. |
| 5,671,089 A | 9/1997 | Allio |
| 5,680,171 A | 10/1997 | Lo et al. |
| 5,689,372 A | 11/1997 | Morton |
| 5,717,844 A | 2/1998 | Lo et al. |
| 5,757,550 A | 5/1998 | Gulick, Jr. |
| 5,850,278 A | 12/1998 | Lo et al. |
| 5,850,580 A | 12/1998 | Taguchi et al. |
| 6,176,582 B1 | 1/2001 | Grasnick |
| 6,288,842 B1 | 9/2001 | Florczak et al. |
| 6,483,644 B1 | 11/2002 | Gottfried et al. |
| 6,545,807 B2 | 4/2003 | Maruyama |
| 6,570,623 B1 | 5/2003 | Li et al. |
| 6,587,276 B2 | 7/2003 | Daniell |
| 6,888,095 B2 | 5/2005 | Khan |
| 8,003,308 B2 * | 8/2011 | Van Groos ............ 430/321 |
| 2002/0054434 A1 | 5/2002 | Florczak et al. |
| 2002/0122024 A1 | 9/2002 | Roggatz |
| 2002/0159156 A1 | 10/2002 | Wohlstadter |
| 2003/0058472 A1 | 3/2003 | Davies et al. |
| 2003/0112523 A1* | 6/2003 | Daniell ............ 359/626 |
| 2003/0160864 A1 | 8/2003 | Kremen |
| 2003/0179364 A1 | 9/2003 | Steenblik et al. |
| 2003/0203078 A1 | 10/2003 | Summers |
| 2004/0087467 A1 | 5/2004 | MacQuarrie |
| 2004/0170725 A1 | 9/2004 | Begleiter |

FOREIGN PATENT DOCUMENTS

| | | |
|---|---|---|
| GB | 643853 | 9/1950 |
| JP | 7281327 | 10/1995 |
| WO | WO 83 03019 | 9/1983 |
| WO | WO 01 03667 | 1/2001 |

OTHER PUBLICATIONS

K.S. Miller and J.M. Krochta; "Oxygen and Aroma Barrier Properties of Edible Films: A Review;" Trends in Food Science & Technology, Jul. 1997 (vol. 8).

B. K. Rozhkov; "Stereoscopy and Integral Image Quality;" Sov. J. Opt. Technol. 49(8), Aug. 1982.

Silvia Manolache, Amar Aggoun, Malcolm McCormick, and Neil Davies; "Analytical Model of a Three-Dimensional Integral Image Recording System that Uses Circular- and Hexagonal-Based Spherical Surface Microlenses;" J. Opt. Soc. Am. A/vol. 128, No. 8/Aug. 2001.

David E. Roberts et al.; "The History of Integral Print Methods," An excerpt from: "Lens Array Print Techniques," 21 pages, (dated prior Mar. 21, 2006).

Adrian Stern and Bahram Javidi, Three-Dimensional Image Sensing, Visualization, and Processing Using Integral Imaging, Proceedings of the IEEE, vol. 94, No. 3, Mar. 2006.

Wu, Chunhong et al. "Depth extraction from unidirectional integral image using a modified multi-baseline technique," May 2002, 11 pages.

Chutjian, A., Collier, R.J., Recording and Reconstructing Three-Dimensional Images of Computer-Generated Subjects by Lippmann Integral Photography, Applied Optics. vol. 7, No. 1 (Jan. 1968).

Davies, N. et al., Three-Dimensional Imaging Systems: A New Development, Applied Optics, vol. 27, No. 21 (Nov. 1988).

De Montebello, R.L., Wide-Angle Integral Photography—The Integram System, SPIE, vol. 120 (1977).

Gennadios, A. Protein-Based Films and Coatings, Chapters 18-22, 24-25 CRC Press (2002).

Okoshi, T., Three-Dimensional Imaging Techniques, Academic Press, (1976).

Hain, M. et al., 3D Integral Imaging Using Diffractive Fresnel Lens Arrays, Optics Express, vol. 13, No. 1 (Jan. 2005).

Krochta, John M. "Edible Protein Films and Coatings", Food Proteins and Their Applications. Marcel Dekker. pp. 529-549. 1997.

* cited by examiner

ACTIVE MASK VARIABLE DATA INTEGRAL IMAGING SYSTEM AND METHOD

RELATED APPLICATIONS

This application is the National Phase application of International application No. PCT/US2007/064521, filed Mar. 21, 2007, which claims the benefit of U.S. Provisional Application No. 60/784,202, filed Mar. 21, 2006, and U.S. Provisional Application No. 60/784,203, filed Mar. 21, 2006, the contents of each of which are fully incorporated herein by this reference.

TECHNICAL FIELD

This invention relates generally to imaging and more particularly to using integral lens arrays for variable three-dimensional images.

BACKGROUND

Auto-stereoscopic methods present what appear to be three-dimensional imagery to a viewer without the need for special glasses or other impediments (hence "auto" stereo). The use of lens sheets, composed of an array of small lenses, to produce auto-stereoscopic imagery is widely known. A lens sheet typically consists of a closely-packed array of plano-convex lenses. The lenses are generally either spherical in shape (for applications in what are called integral methods) or cylindrical in shape (for applications in what are called lenticular methods). The lens sheet itself is transparent and the rear face, which generally constitutes the focal plane, is effectively flat.

When an integral lens array sheet is coated with, or brought into intimate contact with, a light sensitive material layer (such as a photographic emulsion) at the sheet's focal plane and an exposure is made of an illuminated object or image placed at a close proximity to the lens side of the sheet, each individual lens will record its own unique image of the object or image based on its position relative to the array. In other words, the integral method produces a large number of minute, juxtaposed images behind the lens array on the light sensitive material layer. When realigned in original register with the same, or similar, lens sheet after development of the exposure, a composite spatial reconstruction of the object is re-created in front of the lens array that can be viewed from arbitrary directions within a limited viewing angle.

This method of creating images is generally known as Integral Photography or Integral Imaging and was first proposed in 1908 by physicist Professor Gabriel M. Lippmann. He described a method to record a complete spatial image on a photographic plate, with parallax in all directions, utilizing an array of small spherical lenses to both record and playback the image. In his method, later known as the direct method, an object or scene is recorded directly in front of the lens array. Because of limitations in the resolving power of the individual lenslets, the distance an object could be placed in front of the array was limited, and indeed only objects located a few centimeters from the array where properly re-imaged. Unfortunately, unwanted moiré artifacts were also common in this method because of sub image crossover, which occurs when sub images are not juxtaposed and a sub image formed by one lenslet would cross over to an adjacent lenslet. Further, the method only allowed for objects to be recreated in front of the lens array, in other words, objects that appeared to float only in front of the lens array, not within or behind it.

Herbert E. Ives later improved the technique in 1930, by incorporating a large aperture camera lens (a lens with a diameter wider than the interocular distance between the eyes) to optically suspend a "real" aerial image of an object in front of, within, or behind the lens array. Later known as the indirect method, this allowed for a substantial increase the depth of field and for objects to appear to float behind the lens array, instead of just in front. Ives also proposed the use of a large concave mirror as an alternative to the primary lens.

The general optical principles of the indirect method, using a primary lens, are nearly identical to those of an ordinary camera, with three exceptions. First, the objective lens is typically much larger than a normal camera lens, so chosen to accept a wide field of view of an object. Second, a lens array is placed directly in front of and often coated with the light sensitive emulsion, with the lenslet side facing the objective lens. Third, the "real" object is not brought into focus, instead it is placed relative to the lens screen/material layer in such a manner to recreate the appearance of that object at that position.

The indirect method in integral imaging, which often consists of an optical assembly of compound lenses, allows the location of the aerial "real" image to be adjusted by either adjusting the location of the object, modifying the optical assembly, or adjusting the proximity of the lens array within the focal plane of the camera, all along the z axis of the optical train. In other words, objects could be made to appear floating in front of, at the surface, or inside the lens array, or a combination thereof, simply by making one of these adjustments in a precise manner.

Unfortunately, some form of spherical distortion artifacts are common by virtue of the requirement of a relatively large aperture wide angle primary lenses or concave mirror, and the cameras used in such systems are only capable of imaging relatively small actual objects. The biggest drawback, however, to the photographic integral methods is that the recorded images are pseudoscopic, or depth reversed, where the foreground is the background and vise versa. Several complex photomechanical solutions were later proposed to invert the depth. Known collectively as the "two step" methods, they typically involve a secondary exposure of the original photographic plate through another lens sheet.

Later, a "one step" imaging solution was proposed. The "one step" imaging solution includes presenting a calculated computer generated pseudoscopic image to the lens array that naturally re-inverts the image. The image is formed by moving a series of progressively changing contours of an image, in layers, on a cathode ray tube ("CRT") screen or by presenting a succession of computer written transparency film masks in front of a high intensity light source along the optical z axis. The result is a fully volumetric computer generated image. The image is recorded through an integral lens array to a light sensitive emulsion. This approach is based on the direct method (it does not incorporate a primary lens or lenses) therefore resulting in a limited depth-of-field and only being able to reproduce objects that appeared to float in front of the lens screen.

In a known one-step indirect method, the virtual object is formed using a high intensity laser that is scanned by a galvanometer directly to the lens screen through a series of optics. In this method, the primary lens or lens screen is moved along the optical z axis as the image is drawn to achieve a fully volumetric image. This is recorded through an integral lens array to a metal based material layer that is generally ablated or altered thermally to form an image. Such a method has several drawbacks in practical field use for digital variable imagery including the length of the optical path and the use of galvanometer laser scanners and associated optics to produce the image. Use of such equipment likely limits the wide spread use of the method in the field, for example, to produce identification cards (at a local Department of Motor Vehicles, for instance), where a compact, high-speed, user-friendly solution is required.

Moreover, known refractive lens based integral methods incorporate commercially available lens arrays, which limit the use of the methods for security-level anti-counterfeiting applications. Such methods further do not contemplate optical designs that result in an optimized focal point to enable higher lens array frequencies beyond commonly available lens arrays. The use of the integral imagery for anti-counterfeiting applications requires the use of a new approach to lenslet design that puts the misuse of the array, even if duplicated, out of the reach of common counterfeiting methods, such as lithographic printing.

A further need exists for imaging to non-uniform surfaces such as anti-tamper wraps on pharmaceutical bottles or on pharmaceuticals themselves. Nearly all efforts to discourage counterfeiting of pharmaceuticals and other counterfeit-prone edible products have been implemented on the outer packaging of products, including micro-printed, tamper-resistant containers and holograms and covert security features on the packaging. Besides identifiable shapes, colors, and embossed features, few anti-counterfeiting security features have been proposed to protect the edible products themselves. The advantage of creating consumer-recognized security features on the pills themselves becomes especially important when considering the practice of dispensing bulk pharmaceuticals, where no other high security features exist.

One known method includes ink-jet printing edible lens array-related imagery, using edible inks, onto edible products, and then molding an edible lens array on the printed image to create a variety of edible, lens array-based effects. Pharmaceuticals and other small, edible products, however, require a very high frequency lens array, typically exceeding 40 lenses per linear centimeter (exceeding 100 lenses per linear inch), which would greatly limit the quality of the imagery using this method, as ink-jet printing resolutions are generally insufficient for such an array. A higher resolution imaging method is therefore required to yield high quality effects, especially when utilized to provide authentication protection.

BRIEF DESCRIPTION OF THE DRAWINGS

The above needs are at least partially met through provision of the active mask variable data integral imaging system and method described in the following detailed description, particularly when studied in conjunction with the drawings, wherein.

Figure 1:
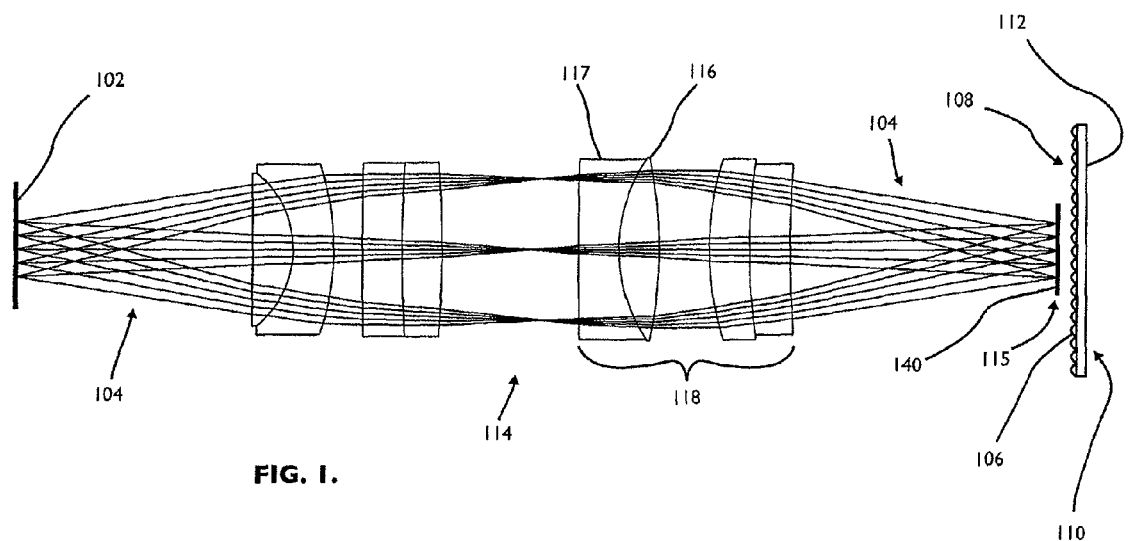
FIG. 1 comprises a side elevational view of an example active digital mask, lens array, and optics system arrangement as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a system for forming an integral image includes an optics system spaced between an active digital mask and the first side of an integral lens array, where the integral lens array has a light sensitive material layer spaced relative to the second side of the integral lens array. Alternatively, the active digital mask may provide the image directly to the integral lens array, or the image may be focused on a projection screen placed relative to the integral lens array. The active digital mask provides an image relative to the integral lens array and light sensitive material such that the light sensitive material and integral lens array allow for viewing of the image as above or below the integral lens array. The active digital mask allows for varying the provided image to create a three dimensional image and to account for distortions caused by the optics system or curvature in the integral lens array and light sensitive material. Optionally, edible materials may be used for the lens array and light sensitive material.

So configured, a volumetric image may be provided using an integral lens array despite aberrations in the optics system or curvature of the lens array and/or light sensitive material. The image may appear to be above, below, or in approximately the same plane as the integral lens array. Moreover, the system may be applied in various high volume, high security applications such as at a Department of Motor Vehicles or for providing security marks on pharmaceuticals and pharmaceutical packaging.

These and other benefits may become clearer upon making a thorough review and study of the following detailed description. Referring now to the drawings, and in particular to FIGS.

1 and 2, a system for forming an integral image includes an active digital mask 102 that provides an image via photons or light 104. The system includes an integral lens array 106 with a first side 108 and a second side 110. A light sensitive material layer 112 is spaced relative to the second side of the integral lens array 106. The light sensitive material layer 112 is often in contact with the second side of the integral lens array 106. Typically, the system includes an optics system 114 spaced between the active digital mask 102 and the first side 108 of the integral lens array 106.

Generally, the active digital mask is a pixel-based screen such as, for example, a rear illuminated pixel based screen, a self-luminous pixel based screen, or a reflective pixel based screen. These screens may be rear illuminated by coherent or incoherent light, depending on the light sensitive material layer utilized, and can be used to form flat imagery that appears to float off or inside the surface of the lens array or used to form a fully volumetric image. For example, with brief reference to FIG. 3, an active digital mask 102 may include a light source 103 and optics (not shown) directing light rays 105 to a screen 107 to provide the image.

More specifically, in the transparency method, an active-matrix liquid crystal display ("LCD"), or similar rear-illuminated pixel-based screen is rear illuminated by an incoherent or coherent light source of sufficient intensity to form juxtaposed sub-images of the pixel screen. The juxtaposed sub-images are provided to a light-sensitive material layer located at the focal plane of an integral lens array.

In the reflective method, a Digital Light Processing micro mirror array ("DLP"), Liquid Crystal On Silicone chip ("LCOS"), or similar reflective pixel-based screen, is front illuminated by an incoherent or coherent light source of sufficient intensity to form juxtaposed sub-images of light reflected from the pixel screen that are provided to a light-sensitive emulsion located at the focal plane of an integral lens array.

In the self-luminous method, a high-resolution Cathode Ray Tube display ("CRT"), an emission flat panel plasma display ("plasma"), a Surface-conduction Electron-emitter Display ("SED"), a Field Emission Display ("FED"), a Light Emitting Diode array ("LED"), an Organic Light-Emitting Diode display ("OLED"), a Polymer Light-Emitting Diode display ("PLED"), or similar self-luminous pixel-based screen is used to form juxtaposed sub-images of the pixel screen that are provided to a light-sensitive material layer located at the focal plane of an integral lens array. In this method, the light-sensitive material layer is formulated or chosen to be adequately sensitive to the available light transmitted by the self-luminous display.

Figure 2:
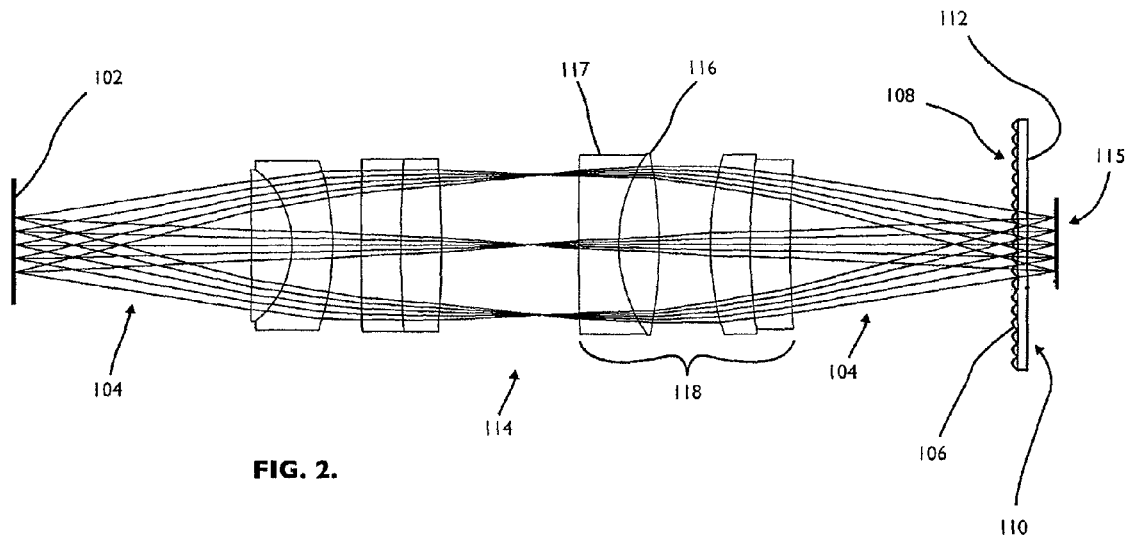
FIG. 2 comprises a side elevational view of an example active digital mask, lens array, and optics system arrangement as configured in accordance with various embodiments of the invention.
Figure 4:
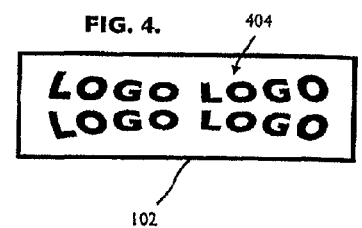
FIG. 4 comprises a front view of an example pre-distorted image provided by an active digital mask as configured in accordance with various embodiments of the invention.
Figure 5:
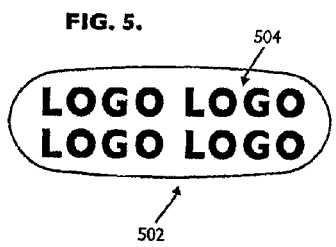
FIG. 5 comprises a front view of a target object bearing an integral image as created in accordance with various embodiments of the invention.

The active digital mask 102 is placed within the optical train such that the active digital mask 102 provides an image 404 (as shown in FIG. 4) that is focused or arranged to provide a suspended aerial image relative to the light sensitive material layer 112 and the integral lens array 106. The suspended aerial image, so configured, modifies the light sensitive material 112 to create a modified light sensitive material. The modified light sensitive material is at least a portion of the light sensitive material exposed to the image 404 from the active digital mask 102. When the modified light sensitive material is viewed through the integral lens array 106, the modified light sensitive material provides a variable image appearing above, within, or below the integral lens array 106. An example is provided at FIG. 5 in which a target object 502, having an integral long array 106 and light sensitive material 112 (not shown) at the object's 502 surface, has been exposed to the image from the active digital mask 102, creating the integral image 504 visible on the object 502. As such, the integral lens array 106 and light sensitive material layer 112 may be placed at a position forward of the focal point 115 of the image 404 from the active digital mask 102 as shown in FIG. 2, at the focal point 115, or at a position behind the focal point 115 of the image 404 from the active digital mask 102 as shown in FIG. 1.

The integral lens array 106 may be configured in a number of ways. It is generally contemplated that the optical properties of the lenslets comprising the integral lens array 106 are designed to focus a set of incoming light rays from the optics system 114 and/or active digital mask 102 to converge to the smallest spot or focal point possible. Preferably, the light rays are focused at the focal plane of the integral lens array 106 (typically at the light-sensitive material layer 112), often taking into account the wavelength of light being used in the imaging process. Such a configuration allows for a higher-frequency lens count than is commonly commercially available for integral imaging or lithography thereby providing an added level of security by frustrating counterfeiters using lithographic methods to attempt to replicate the imaging process.

By one approach, the integral lens array 106 includes at least one of either a plurality of refractive lenses or a plurality of diffractive lenses. Such lens arrays are generally known in the art. For instance, lens arrays using refractive or diffractive lenses can be used for focal plane light intensification for charge-coupled device ("CCD") arrays.

By another approach, the integral lens array 106 includes a plurality of refraction-diffraction hybrid lenses. In such an approach, each of the refraction-diffraction hybrid lenses includes a diffractive component and a refractive component. The refractive component of the surface lens is aspherical. The diffractive component of the lens is comprised of a plurality of concentric, ring-shaped facets. The diffractive component is based on the wave nature of light because its features are in the same order of magnitude as the wavelength of light used. Thus, the diffractive component makes use of interference (the interaction of waves such as light waves with each other) to "break" a light wave and "re-arrange" it so that the new wave or waves propagate in the direction of constructive interference. The diffractive component of this lens is so designed to preferably add a near perfect spherical-aberration correction that could otherwise not be achieved with a single refractive surface. This correction is possible for any wavelength and F-number.

So configured, the refractive/diffractive hybrid lens typically has an increased efficiency allowing such lenses to be substantially reduced in size. By a typical approach, the diffractive and refractive components are designed into a single surface lens. Such approaches can achieve focal point sizes below one micron (0.000001 meter). For example, integral lens arrays using refractive/diffractive hybrid lenses can be made having very fine-pitched arrays of over seventy (70) lenses per linear centimeter (two hundred lenses per linear inch). The refraction/diffraction lens design provides other advantages including being highly efficient in the imaging process, especially when using a narrow band wavelength illumination, while remaining an acceptable lens for viewing the image under ambient, white-light conditions. This hybrid design has the further advantage of substantially reducing the profile of the lens to allow the array to be manufactured with techniques such as UV embossing, extrusion, hot embossing, and injection molding, each of which are known in the art and thus require no further discussion herein.

Regardless of the design of the individual lenses, the integral lens array 106 is typically formed on one side of a transparent material, the thickness of which is determined to correspond with the focal length of the lenses. This focal length is determined by the wavelength of light used in the imaging process, the refractive index and Abbe properties of the material, and the angle of incoming light rays from the optics system 114 or active digital mask 102.

Lenslet configurations can include, but are not limited to, square, hexagonal, triangular, random, and diamond packed arrangements of generally spherical lenslets. The lens array itself can be formed in sheets, continuous web form, and/or in isolated spot form where the lens array portion of the sheet or product is limited to a fraction of the overall material. The remaining material may remain otherwise clear or include other unrelated surface features.

The material of the integral lens array 106 can include any optical-grade, effectively transparent material such as a plastic material like a petroleum based polymer or a starch based polymer. Illustrative examples include polyvinyl chloride ("PVC"), polyesters, polycarbonate, acrylic, polystyrene, polypropylene, or optical glass. The lens array surface itself can be formed prior to imaging, formed as an unexposed material, formed within the imaging system, or formed after imaging, as may be the case when the image is calculated and not imaged directly through the lenses. By other approaches, the integral lens array 106 may be constructed out of edible material so as to make an edible integral lens array. The edible integral lens array may be used to provide images on confectionary items or on pharmaceuticals, for example. The edible lens array may be made out of any one of pullulan, starch, cellulose ethers, gellan gum, carrageenan, alginate and hydroxypropylmethylcellulose ("HPMC"), hydroxypropylated starch, gelatin, hydrated gelatin (for example those known as flash melt types and other edible films), glucose, maltose, sucrose, dextrose, and fructose.

In general, the edible integral lens array is formed on a product over an edible, light-sensitive material layer. The thickness of the edible integral lens array layer is determined to correspond with the focal length of the lenses formed on its surface. This focal length is determined by the wavelength of light used in the imaging process, the refractive index and Abbe properties of the material, and the angle of incoming light rays from the camera optics.

The edible integral lens array may be formed using a variety of known methods including embossing, molding, hot or cold press, or other suitable method such that the material accepts a lens morphology from a die. For many of these materials, a drying process after formation of the polysaccharide coating is often necessary, thereby requiring a consideration of the effect some coating shrinkage on the edible lens array die design. Certain extruded starch sheets, however, require no drying after the die-molded coating process. More specifically, the edible lens array surface may be formed by "silk" screening though pre-defined apertures to form beads of material, chill-embossing the pattern directly onto the heated material, disposing grains of material to an agglutinative coating that is heated to form a beaded shape, or directly molded through embossing and released upon curing. These methods are generally known in the art.

By certain approaches, the edible lens array pattern may cover the entire product or be formed in isolated areas, where the edible lens array portion of the product is limited to a fraction of the overall product surface area that is otherwise clear or consists of other unrelated surface features. In other approaches, the edible lens array can also be formed in a separate step and later adhered to the product, both in sheet or continuous web form.

The integral lens array 106 is formed relative to the light sensitive material 112. The light-sensitive material layer 112 is generally disposed on the second side 110 of the integral lens array 106, typically at the focal plane of the lens array 106. The light sensitive material 112 is light sensitive and forms a defined change in contrast and/or color upon exposure to a specified intensity of light for a specified period of time. The coating may be formulated to be wavelength specific or sensitive to a wider band of light. Light sensitive materials sensitive to shorter-wavelength light produce finer image features, which is useful in approaches using higher frequency or higher density integral lens arrays. One example of such a material includes Dupont's DYLUX brand film coatings. Such materials allow for finer detailed images on the target surface. Such light sensitive materials allow for handling in daylight conditions, without the use of a darkroom thereby decreasing the effort needed in post-processing the image.

A preferred approach for the light sensitive material 112 incorporates a wavelength(s) specific, molecular grain, and process-less coating or coatings, although panchromatic coatings could also be used. A light sensitive material 112 including a molecular grain coating typically provides a very fine grain that in turn provides an improved resolution to allow for the use of higher frequency or higher density integral lens arrays.

In one such application, the active digital mask 102 provides an image 404 of extremely fine micro-text to be captured by the light sensitive material 112. When viewed after exposure, the text becomes generally unreadable as a blurred, far-foreground floating element, but when a substantially transparent surface, such as a ground glass or other similar surface, is placed in space at the apparent position of the blurred text, the text becomes at least in part, substantially visible on the glass as readable text. The fine letters or other components of the text can be a fraction of the width of an individual lenslet. This micro-text can be imaged as part of the volumetric image in the system. This approach typically brings additional value to the process as a covert security mark.

The light sensitive material layer may or may not require chemical processing to develop the image after exposure. By some approaches, including, for example, Dupont's DYLUX brand coating, Fujifilm's CODESTREAM brand coating, and coatings developed by and commercially available from DataLase, the coatings do not require post chemical processing, and will produce changes in contrast and/or color upon exposure to light, and maintain said change in contrast indefinitely thereafter. Such materials reduce post-processing time and cost.

By other approaches, the light sensitive material layer 112 may be an edible light sensitive material layer. The general requirements of the edible light-sensitive layer are that it can be applied as a thin (often less than about 10 μm) coating with good coverage and adhesion to a pharmaceutical or food product, that it will discolor under light radiation, for example intense ultra violet ("UV") light, to form the desired image, and that it will adhere well to an overlaid edible integral lens array coating layer.

The edible light sensitive material layer may be made of any suitable material. For example, the material may include any one of a carbohydrate with a metal salt, at least one protein-based film, wheat gluten, a soy protein and a whey protein, polysaccharide, starch, modified starch, cellulose ethers, alginates, carrageenans, and a gum. Protein-based films, for instance, discolor in ultra violet light. Another example, corn zein, the main protein in the corn endosperm, is available commercially as a food or pharmaceutical coating. Bovine, porcine, and fish gelatin are also available commercially for coating.

By some approaches, edible light sensitive materials are prepared by adding edible components to polysaccharide coatings to achieve a UV-sensitive material. This includes starch, modified starch, cellulose ethers (such as methyl cellulose ("MC"), hydroxyproply methylcellulose ("HPMC") or hydroxypropyl ethylcellulose ("HPEC")), alginates, carrageenans, and gums such as pectin and gellan. HPMC, for example, is used for pan and fluidized-bed coating of pharmaceutical tablets.

Regardless of the type of coating used, it often can be formulated to be wavelength specific or sensitive to a specific band of light. As discussed above, light sensitive materials sensitive to shorter-wavelength light produce finer image features, which is useful in approaches using higher frequency or higher density integral lens arrays thereby allowing for finer detailed images on the target surface. Similarly, formulations such as those commercially available from DataLase such as its PHARMAMARK brand coatings allow for handling in daylight conditions without the use of light-controlled environments can save post-processing time and expense.

By one example approach, an edible integral lens array may include 1) an underlying HPMC layer with a UV-sensitive additive acting as the light sensitive material layer 112 and 2) an overlaid die-molded polysaccharide ("PS") lens array over the HPMC. Although the PS lens array is typically formed through a chilled drum casting method, extrusion is an alternative method of creating the PS integral lens array.

With reference again to the approach of FIG. 1, the optics system 114 focuses the image 404 from the active digital mask 102 relative to the placement of the integral lens array 106. This setup allows for a number of options in the type of integral image 504 created. The optics system 114 may include any one or more of several optical elements including a primary lens 116, a compound lens 118, a mirror, and a lens screen 117. The combination of such elements with the active digital mask 102 and the integral lens array 106 create an optical train that can be adjusted as needed.

The optics system 114 may optionally include six to eighteen anti-reflection coated elements arranged in a mostly symmetrical fashion from left to right about the center axis to cancel aberrations made with singlets and doublets of crown and flint glasses and to reduce chromatic aberrations. So configured, the optics system 114 may allow performance across the visible spectrum at the red, green, and blue wavelengths of the active digital mask 102 so as to create full color images.

Figure 3:
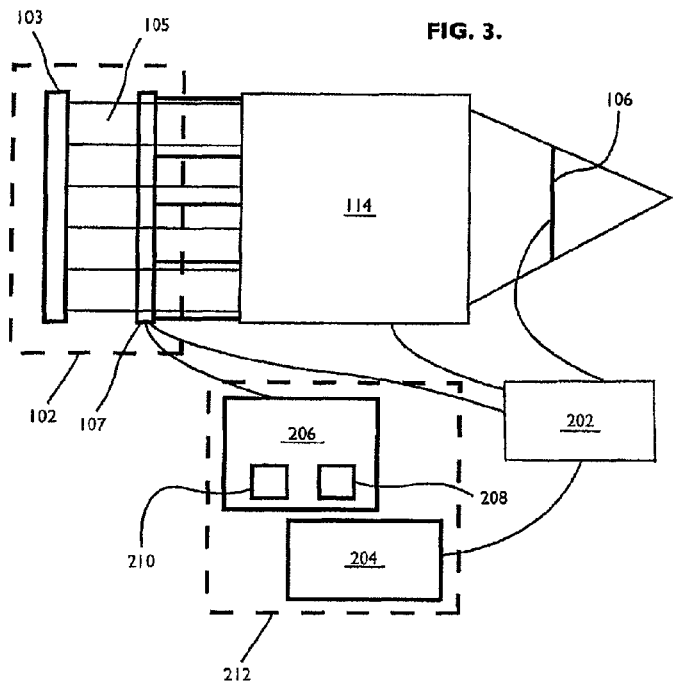
FIG. 3 comprises a block diagram of a system as configured in accordance with various embodiments of the invention.

With reference to FIG. 3, at least one motor 202 may be operatively coupled to a controller 204 and at least one of the optics system 114, a portion of the optics system 114, the active digital mask 102, and the integral lens array 106 such that the motor(s) 202 controls, at least in part, the relative movement of the optics system 114 or portions thereof, the active digital mask 102, and/or the integral lens array 106. As is known in the art, relative movement of elements of the optical train will affect the focal point of the image provided by the active digital mask 102 thereby affecting how the image is captured by the light sensitive material layer 112. Therefore, through the motor controller 204, the integral image 504 and result of the exposure of the light sensitive material later 112 may be controlled.

Typically, different motors 202 are coupled to the different movable elements. For example, the active digital mask 102, the primary lens 116, and/or the integral lens array 106 can each be connected to a different motor 202, such as a linear motor as are generally available in the art, such that each may be independently moved along the long or "Z" axis of the system to adjust the relative distances among the elements.

Figure 6:
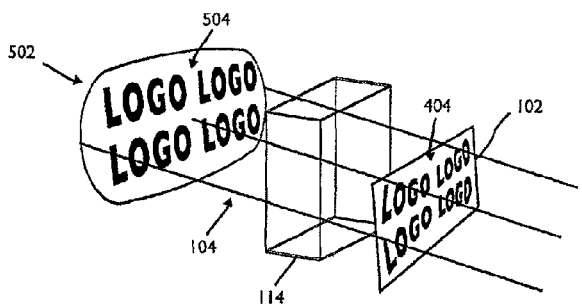
FIG. 6 comprises a perspective view of an example system as configured in accordance with various embodiments of the invention.

In still a further approach and with reference to FIG. 6, the active digital mask 102 is a rear illumination screen with optics (not shown) that provide at least one of either converging or parallel light rays. The active digital mask 102 is spaced directly in front of the first side 108 of the integral lens array 106 disposed toward the active digital mask 102, but just off the surface of the integral lens array 106, usually at less than approximately three centimeters (approximately one and a quarter inches). The light sensitive material layer is spaced relative to the second side 110 of the integral lens array 106, away from the active digital mask 102. This approach simplifies and greatly reduces the length of the optical train. If the light rays are collimated, this will form an integral image 504 that appears to float off the surface of the integral lens array 106. If the light rays are parallel (not collimated), this will produce a non-dimensional integral image 504 of the active digital mask 102 that will disappear upon viewing the integral lens array 106 at an off-axis.

Figure 8:
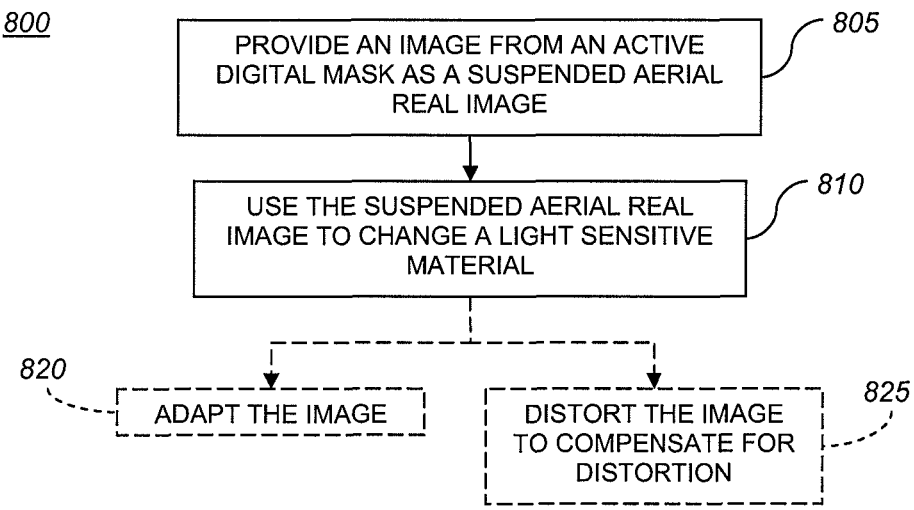
FIG. 8 comprises a flow diagram of a method of providing an integral image as configured in accordance with various embodiments of the invention.

In general, and with reference to FIGS. 1 and 8, the method 500 for creating images, for example on a non-flat surface, includes providing 805 an image 404 from the active digital mask 102 as a suspended aerial real image relative to a first side 108 of an integral lens array 106. The suspended aerial real image is used 810 to change at least one of the color and contrast of the light sensitive material 112 disposed on the second side 110 of the integral lens array 106 opposite of the active digital mask 102. The image 404 from the active digital mask 102 may be adapted 820 using optics 114 disposed between the active digital mask 102 and the integral lens array 106 such that the suspended aerial real image is positioned relative to the integral lens array 106. In other approaches, an image 404 from the active digital mask 102 is altered in at least one of brightness and exposure time for the foreground elements and/or background elements to achieve an at least substantially uniform exposure to the light sensitive material 112. In yet other approaches, as will be described further below, the method 800 includes distorting 825 the image 404 to compensate for optical distortion caused by the optics or to compensate for imaging to a non-flat light sensitive material 112 and/or the integral lens array 106.

Figure 7:
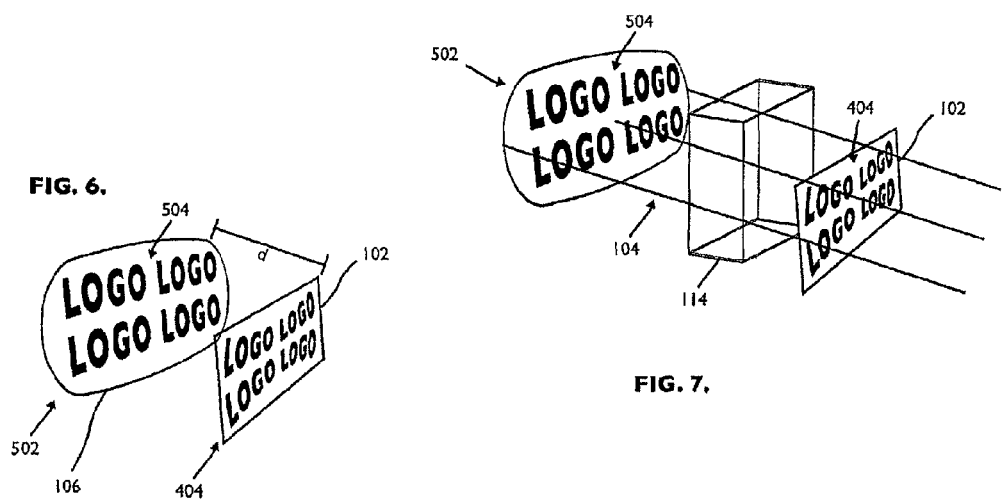
FIG. 7 comprises a perspective view of an example system as configured in accordance with various embodiments of the invention.

In one approach to creating an integral image as seen in FIG. 7, the optical train and active digital mask 102 can be fixed, to repeatedly form a recreated flat plane image 504 from the active digital mask 102 on the target object 502 that would appear to float above or below the integral lens array 106. The image 404 presented from the active digital mask 102 can change content from exposure to exposure, but the image 404 will always appear as a floating flat plane above or below the integral lens array 106. Alternately, the active digital mask 102 can be placed at a fixed angle, not perpendicular to the z-axis or long axis of the optical train, to create images 504 through the integral lens array 106 and light sensitive material layer 112 of the object 502 that appear to run from the background to the foreground.

In another approach, the active digital mask 102 can form a fully volumetric image 504 in the integral lens array 106 and light sensitive material layer 112 by drawing a continuous contour of the image while moving the active digital mask 102, for example by using a motor 202, along the optical z-axis at a synchronous speed. Optionally, one can alternately move either the primary lens 116 or the optical system 114 along the z-axis to achieve a similar result. The variable image 404 presented to the integral lens array 106 in this example is created to be intentionally pseudoscopic, so when the recorded image 504 is viewed it is orthoscopic (not depth reversed).

In yet another approach, the active digital mask 102 can form a fully volumetric image by spinning the active digital mask 102 in a manner similar to swept-plane volumetric displays. The principle is to have a two dimensional ("2D") surface sweep in a circle, creating a volume. The image 404 on the 2D active digital mask 102 surface changes as the surface rotates so as to draw a volumetric image in space. In swept-plane volumetric displays, humans perceive a volume because of the persistence of vision. In this case, the integral lens array 106 and light sensitive material layer 112 record this persistent image from the active digital mask 102 as if it were a real, three-dimensional object. As with other approaches, the location of the suspended aerial "object," as it relates to the integral lens array 106, can be altered by changing the position of the active digital mask 102, the primary lens 116, the optical system 114, or the integral lens array 106 along the z axis. The image 404 presented to the integral lens array 106 in this approach is created again to be intentionally pseudoscopic, so when the recorded image 504 is viewed it is orthoscopic.

In a further approach, because the optical system 114 suspends the aerial image in space to be intersected by the integral lens array plane, the integral lens array 106 need not be a flat surface to the record the image. A variety of non-uniform shapes can allow for an image 504 to be formed that is viewable as a whole. Viewing the recorded image 504 outside of a certain limited viewing angle, however, can cause the image 504 to appear distorted. Images recorded in this way are difficult to calculate and produce by any other integral imaging reproduction method, including lithographic printing, and are therefore especially useful in anti-counterfeiting applications. Non-uniform surfaces include, for example, box shapes, cylindrical or spherical shapes, and complex molded shapes. Example applications include a tamper-evident plastic wrap around a pharmaceutical bottle lid or other product packaging.

Active digital mask 102 pixel screens, as described herein, can cause undesirable moiré effects when used in conjunction with integral lens arrays 106 because of regular geometric patterns in both the active digital mask 102 and integral lens array 106 that can conflict with one another. These effects can be reduced in a number of ways. By one approach, selecting the magnification of the image from active digital mask 102 can reduce image artifacts. By a second approach, selecting a digital active mask 102 and/or an integral lens array 106 resolution to reduce image artifacts. By a third approach, the active digital mask 102 may be tilted slightly, along the x/y-axis, relative to the integral lens array 106 to reduce image artifacts. In a forth approach, randomly packed lenslets of the integral lens array 106 and/or organic random pixel screens used for the active digital mask 102 may be used to reduce the possible moiré effects.

By a fifth approach, a projection surface 140 is spaced between the active digital mask 102 and the integral lens array 106 such that an image 404 from the active digital mask 102 is projected onto the projection surface 140. The projection surface 140 typically is placed at the focal point 115 of the optics system 114 and made of a ground glass surface, although other suitable substantially transparent projection screens may be used. This approach reduces undesirable moiré effects that may occur through the use of the active digital mask 102 with the integral lens array 106 by reducing or eliminating the pattern induced by the active digital mask 102.

It is further contemplated that because the imagery 404 presented by the active digital mask 102 is digital, any distortions caused by the optics system 114 or curvature in integral lens array 106 and/or the light sensitive material 112 can be reverse-compensated by preemptively distorting the image 404 presented by the active digital mask 102. As such, an image 404 from the active digital mask 102 can be distorted 525 to compensate for optical distortion caused by the optics or to compensate for curvature in either the light sensitive material 112 and/or the integral lens array 106.

With reference to FIG. 3, a mask controller or computer 206 is operatively coupled to the active digital mask 102 such that the computer 206 controls, at least in part, distortion in images 404 displayed by the active digital mask 102. The mask controller or computer 206 may include a memory circuit 208 and a processor circuit 210 for performing ray tracing to determine corrective distortion to apply to the images 404 displayed by the active digital mask 102. Those skilled in the art will recognize and understand that the memory circuit 208, processor circuit 210, mask controller 206, and/or the motor controller 204 may be comprised of a plurality of physically distinct elements as is suggested by the illustration shown in FIG. 3. It is also possible, however, to view this illustration as comprising a logical view, in which case one or more of these elements can be enabled and realized via a shared platform 212. It will also be understood that such a shared platform 212 may comprise a wholly or at least partially programmable platform as are known in the art.

Figure 9:
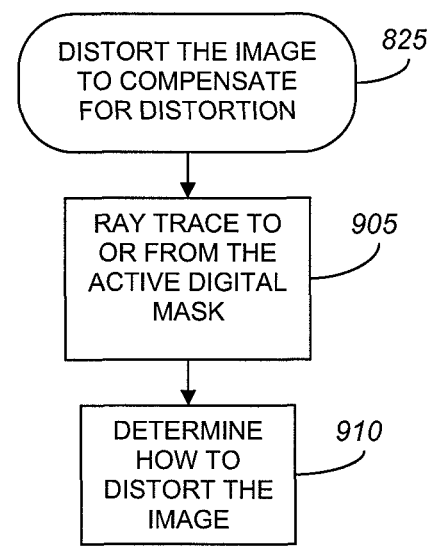
FIG. 9 comprises a flow diagram of a method of distorting an image to compensate for distortion as configured in accordance with various embodiments of the invention.

By one approach, the ray tracing can be accomplished by presenting a succession of grid distortion targets within the allowable z-space, including elements of the optics system 114, the integral lens array 106, and/or the projection surface 140, and measuring the differences between the actual light ray path and the expected. For instance, with reference to FIG. 9, the method of correcting distortions in the image 504 may include using software to ray trace 605 between the active digital mask 102 and the integral lens array 106 and determining 610, at least in part in response to the ray trace, how to distort the image 404 from the active digital mask 102. Similarly, the method of correcting distortions in the image 504 may include using software to ray trace between the active digital mask and the light sensitive material 112, through the integral lens array 106, and determining, at least in part in response to the ray trace, how to distort the image 404 from the active digital mask 102. Then, based on these simulations and/or measurements, the image 404 provided by the active digital mask 102 is digitally compensated for these distortions. As shown in FIG. 7, for example, the image 404 of the words "LOGO" may be distorted at the active digital mask 102, to account for aberrations in the optics 114 such as the primary lens 106 and curvature in the target object 502, such as where the object 502 a pharmaceutical pill. Thus, the image 504 created on the object 502 will not exhibit distortions caused by the optics system 114 or the object's 502 curvature.

An example of software capable of such ray tracing includes software for performing computer-aided design ("CAD"). For instance, using certain CAD software programs as are readily available, one can create wireframe models of every element through which the light rays 104 travel between the active digital mask 102 and the light sensitive material 112, thereby allowing the software to predict distortion and other undesirable effects. Software products marketed and sold under the 3D STUDIO MAX brand can provide this capability.

By another approach, an integral image can be created, and distortions in the integral image can be observed by scanning or other adequate method. Thus, through observing the distortions, the computer 206 can distort the image from the active digital mask 102 in response to the observed distortions in the image created in the light sensitive material 112. This process may include a simple trial and error process to eliminate or reduce undesirable effects.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Also, those any of the above procedures may also be used to optimize imagery formed on non-uniform surfaces.

So configured, nearly any virtual object or scene can be imaged using the teachings of this disclosure, including a human face. Hardware and software to capture the contour of a human face and subsequently digitally combine that contour with color and shading information is now readily available. The disclosed system may be used, therefore, to create products like secure identification cards and other identification documents. Further, because the system utilizes readily available, inexpensive, pixel-based active digital masks, a system of this sort could be produced at low cost, and in a compact space, making the technology well suited for use in the field, such as within a local Department of Motor Vehicles or other governmental field office. The volumetric display can utilize any color (wavelength) of light for monochromatic emulsions, white light, or a combination or red, green, and blue light to realize full color images to be recorded in one step to a pan-chromatic, light-sensitive material layer.

Those skilled in the art will recognize that a wide variety of modifications, alterations, and combinations can be made with respect to the above described embodiments without departing from the spirit and scope of the invention. For example, if it is necessary to produce multiple copies of the same image, the volumetric imaging device can image multiple copies at once to increase the speed of production. For example, if the dimension of the entire image area is 64.5 square centimeters (ten square inches), and a 6.45 square centimeter (one square inch) image is required, then one hundred images could be imaged in one exposure. In the process of manufacturing the imagery, the images may be formed in multiples to the integral lens array in sheet form or a continuous web of material, to be finished in subsequent steps, or on individual finished products, such as drivers' licenses, passports, or tamper evident lid seals. The integral lens array can also be formed on demand, within the imaging system.

In another approach, because the integral imaging approach allows for parallax information to be presented in both vertical and horizontal directions, two or more separate images can be recorded within the same image space, the final product of which would appear to flip from one image to another as the lens array was tilted and viewed from different directions. The multiple images could be related or unrelated, stereoscopically based or just separate flat imagery, or a combination thereof. Such modifications, alterations, and combinations of the disclosed elements are to be viewed as being within the ambit of the inventive concept.

We claim:

1. A system for forming an integral image, the system comprising:
    an active digital mask;
    an integral lens array with a first side and a second side;
    a light sensitive material layer spaced relative to the second side of the integral lens array;
    an optics system spaced between the active digital mask and the first side of the integral lens array:
    wherein the active digital mask is configured to, in combination with the optics system, produce a suspended aerial image floating above or below the light sensitive material layer effective to modify the light sensitive material layer to provide a variable image appearing above or below the light sensitive material when viewed by a viewer.

2. The system of claim 1 wherein the active digital mask comprises at least one of the group comprising:
    a rear illuminated pixel based screen;
    a self-luminous pixel based screen; and
    a reflective pixel-based screen.

3. The system of claim 1 wherein the integral lens array comprises a plurality of refraction-diffraction hybrid lenses.

4. The system of claim 3 wherein each of the refraction-diffraction hybrid lenses includes a diffractive component and a refractive component.

5. The system of claim 1 wherein the integral lens array comprises at least one of a group comprising a plurality of refractive lenses and a plurality of diffractive lenses.

6. The system of claim 1 wherein the integral lens array comprises a plastic material comprising at least one of a group comprising:
    a petroleum based polymer; and
    a starch based polymer.

7. The system of claim 1 wherein the integral lens array comprises an edible integral lens array.

8. The system of claim 7 wherein the edible integral lens array comprises at least one of a group comprising:
    pullulan;
    starch;
    cellulose ethers;
    gellan gum;
    carrageenan;
    alginate and hydroxypropylmethylcellulose;
    hydroxypropylated starch;
    gelatin;
    hydrated gelatin;
    glucose;
    maltose;
    sucrose;
    dextrose; and
    fructose.

9. The system of claim 1 wherein the light sensitive material layer comprises a molecular grain coating.

10. The system of claim 1 wherein the light sensitive material layer comprises a process-less light sensitive coating that changes at least one of color and contrast when exposed to a light source.

11. The system of claim 1 wherein the light sensitive material layer comprises an edible light sensitive material layer.

12. The system of claim 11 wherein the edible light sensitive material layer comprises at least one of a group comprising:
    a carbohydrate and a metal salt;
    at least one protein-based film;
    wheat gluten;
    a soy protein and a whey protein;
    polysaccharide;
    starch;
    modified starch;
    cellulose ethers;
    alginates;
    carrageenans; and
    a gum.

13. The system of claim 1 wherein the optics system comprises at least one of a group comprising a primary lens, a compound lens, and a lens screen.

14. The system of claim 1 wherein an image from the active digital mask is distorted to compensate for curvature in at least one of the integral lens array and the light sensitive material.

15. The system of claim 1 wherein an image from the active digital mask is altered in at least one of brightness and exposure time for at least one of a group comprising foreground elements and background elements to achieve at least substantially uniform exposure to the light sensitive material.

16. The system of claim 1 further comprising at least one motor operatively coupled to a controller and at least one of the optics system, the active digital mask, and the integral lens array such that the at least one motor controls, at least in part, relative movement of the optics system, the active digital mask, and the integral lens array in the z-axis.

17. The system of claim 1 further comprising a projection surface spaced at the focal point between the active digital mask and the integral lens array such that an image from the active digital mask is projected onto the projection surface.

18. The system of claim 17 wherein the projection surface comprises a ground glass surface.

19. The system of claim 1 further comprising a computer operatively coupled to the active digital mask such that the computer controls, at least in part, distortion in images displayed by the active digital mask.

20. The system of claim 19 wherein the computer further comprises a memory circuit and a processor circuit for per ray tracing to determine corrective distortion to apply to the images displayed by the active digital mask.

21. A system for forming an integral image on a non-flat surface, the system comprising:
an active digital mask comprising a rear illumination screen with optics that provide from a single stored image juxtaposed sub-images at a focal point between an integral lens array and the optics or behind the integral lens array relative to the optics;
the integral lens array spaced less than approximately three centimeters from the active digital mask, the integral lens array comprising a first side disposed toward the active digital mask and a second side disposed away from the active digital mask;
a light sensitive material layer spaced relative to the second side of the integral lens array:
wherein the juxtaposed sub-images are effective to modify the light sensitive material layer to provide a variable image appearing above or below the light sensitive material when viewed by a viewer.

22. The system of claim 21 wherein the integral lens array comprises a plurality of refraction-diffraction hybrid lenses.

23. The system of claim 21 wherein the integral lens array comprises at least one of a group comprising a plurality of refractive lenses and a plurality of diffractive lenses.

24. The system of claim 21 wherein the integral lens array comprises an edible integral lens array.

25. The system of claim 24 wherein the edible integral lens array comprises at least one of a group comprising;
pullulan;
starch;
cellulose ethers;
gellan gum;
carrageenan;
alginate and hydroxypropylmethylcellulose;
hydroxypropylated starch;
gelatin;
hydrated gelatin;
glucose;
maltose;
sucrose;
dextrose; and
fructose.

26. The system of claim 21 wherein the light sensitive material layer comprises an edible light sensitive material layer.

27. The system of claim 26 wherein the edible light sensitive material layer comprises at least one of a group comprising:
a carbohydrate and a metal salt;
at least one protein-based film;
wheat gluten;
a soy protein and a whey protein;
polysaccharide;
starch;
modified starch;
cellulose ethers;
alginates;
carageenans; and
a gum.

28. The system of claim 21 wherein an image from the active digital mask is distorted to compensate for curvature in at least one of the integral lens array and the light sensitive material.

29. The system of claim 21 further comprising a computer operatively coupled to the active digital mask such that the computer controls at least in part distortion in images displayed by the active digital mask.

30. The system of claim 29 wherein the computer further comprises a memory circuit and a processor circuit for performing ray tracing to determine distortion to apply to the images displayed by the active digital mask.

31. A method for creating images on a non-flat surface, the method comprising:
providing juxtaposed sub-images from a single stored image from an active digital mask as a suspended aerial real image at a focal point spaced separately from an integral lens array;
using the suspended aerial real image to change at least one of color and contrast of a light sensitive material disposed on a side of the integral lens array opposite of the active digital mask to provide a variable image appearing above or below the light sensitive material when viewed by a viewer.

32. The method of claim 31 further comprising adapting the image using optics disposed between the active digital mask and the integral lens array such that the suspended aerial real image is positioned relative to the integral lens array.

33. The method of claim 32 wherein providing the image from the active digital mask comprises distorting the image to compensate for optical distortion.

34. The method of claim 33 wherein distorting the image further comprises using software to ray trace between the active digital mask and the integral :lens array and determining, at least in part in response to the ray trace, how to distort the image.

35. The method of claim 33 wherein distorting the image further comprises using software to ray trace between the active digital mask and the light sensitive material and determining, at least in part in response to the ray trace, how to distort the image.

36. The method of claim 33 wherein distorting the image further comprises observing distortions in an image created in the light sensitive material in response to the image from the active digital mask and distorting the image in response to the Observed distortions in the image created in the light sensitive material.

37. The method of claim 32 wherein providing the image from the active digital mask comprises projecting the image onto a transparent surface at the focal point disposed between the optics and the integral lens array.

38. The method of claim 31 wherein providing the image from the active digital mask comprises distorting the image to compensate for imaging to a non-flat light sensitive material.

39. The method of claim 38 wherein distorting the image further comprises using software to ray trace between the active digital mask and the integral lens array and determining, at least in part in response to the ray trace, how to distort the image.

40. The method of claim 38 wherein distorting the image further comprises using software to ray trace between the active digital mask and the light sensitive material and determining, at least in part in response to the ray trace, how to distort the image.

41. The method of claim 38 wherein distorting the image further comprises observing distortions in an image created in the light sensitive material in response to the image from the active digital mask and distorting the image in response to the observed distortions in the image created in the light sensitive material.

42. The method of claim 31 wherein providing the image from the active digital mask comprises altering at least one of a brightness and an exposure time for at least one of a foreground element and a background element of the image to achieve uniform exposure to the light sensitive material.

43. The method of claim 31 further comprising tilting the active digital mask relative to the integral lens array to reduce image artifacts.

44. The method of claim 31 further comprising selecting a magnification of the image to reduce image artifacts.

45. The method of claim 31 further comprising selecting a resolution of the image to reduce image artifacts.

46. The method of claim 31 wherein the image comprises at least in part text wherein the elements of the text at the light sensitive material are smaller than a width of a lenslet of the integral lens array.

47. The method of claim 46 further comprising placing a substantially transparent layer relative to the light sensitive material to render the text from the light sensitive material at least in part, substantially readable.

* * * * *

UNITED STATES PATENT AND TRADEMARK OFFICE
CERTIFICATE OF CORRECTION

PATENT NO. : 8,547,524 B2  
APPLICATION NO. : 12/293387  
DATED : October 1, 2013  
INVENTOR(S) : Roberts et al.

Page 1 of 1

It is certified that error appears in the above-identified patent and that said Letters Patent is hereby corrected as shown below:

IN THE CLAIMS:

Column 14, Claim 1, Line 2: delete "array:" and insert -- array; --.

Column 15, Claim 20, Line 30: delete "per" and insert -- performing --.

Column 15, Claim 21, Line 46: delete "array:" and insert -- array; --.

Column 16, Claim 27, Line 22: delete "carageenans;" and insert -- carrageenans; --.

Column 16, Claim 34, Line 57: delete ":lens" and insert -- lens --.

Column 17, Claim 36, Line 2: delete "Observed" and insert -- observed --.

Signed and Sealed this  
Fourth Day of February, 2014

Michelle K. Lee  
*Deputy Director of the United States Patent and Trademark Office*